US012672140B2

(12) United States Patent
Lin et al.

(10) Patent No.: US 12,672,140 B2
(45) Date of Patent: Jun. 30, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yanan Lin, Dongguan (CN); Jing Xu, Dongguan (CN); Yi Zhang, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 299 days.

(21) Appl. No.: 18/646,346

(22) Filed: Apr. 25, 2024

(65) Prior Publication Data

US 2024/0276496 A1     Aug. 15, 2024

Related U.S. Application Data

(63) Continuation of application No. PCT/CN2021/136909, filed on Dec. 9, 2021.

(51) Int. Cl.
| | |
|---|---|
| *H04W 72/1273* | (2023.01) |
| *H04L 1/1812* | (2023.01) |
| *H04W 72/0446* | (2023.01) |
| *H04W 72/11* | (2023.01) |
| *H04W 72/1268* | (2023.01) |
| *H04W 72/232* | (2023.01) |

(52) U.S. Cl.
CPC ....... *H04W 72/1273* (2013.01); *H04L 1/1812* (2013.01); *H04W 72/0446* (2013.01);
(Continued)

(58) Field of Classification Search
CPC ......... H04W 72/1273; H04W 72/0446; H04W 72/11; H04W 72/1268; H04W 72/232;
(Continued)

(56) References Cited

U.S. PATENT DOCUMENTS

| | | | | |
|---|---|---|---|---|
| 12,113,745 B2 * | 10/2024 | Wu | ......... | H04L 1/1812 |
| 12,500,701 B2 * | 12/2025 | Wu | ......... | H04L 1/1854 |

(Continued)

FOREIGN PATENT DOCUMENTS

| | | |
|---|---|---|
| CN | 113228549 A | 8/2021 |
| CN | 113439468 A | 9/2021 |

OTHER PUBLICATIONS

PCT International Search Report for International Application No. PCT/CN2021/136909 dated Sep. 2, 2022.
(Continued)

*Primary Examiner* — J. Brant Murphy
(74) *Attorney, Agent, or Firm* — Quarles & Brady LLP

(57) ABSTRACT

A wireless communication method, a terminal device, and a network device are provided. The method includes: determining, by a terminal device, a first physical channel or a first time unit in which a first physical channel is located, where the first physical channel is used to transmit first feedback information corresponding to a first PDSCH, the first time unit is later than a second time unit, and the second time unit is a time unit determined based on pre-configured information and used to transmit the first feedback information corresponding to the first PDSCH; receiving, by the terminal device, a second PDSCH, where HARQ process number carried in the second PDSCH is the same as HARQ process number carried in the first PDSCH; and determining, by the terminal device, an operation for the first feedback information based on a time domain position associated with the second PDSCH.

20 Claims, 6 Drawing Sheets

(52) U.S. Cl.
CPC ........ *H04W 72/11* (2023.01); *H04W 72/1268* (2013.01); *H04W 72/232* (2023.01)

(58) Field of Classification Search
CPC ... H04L 1/1812; H04L 1/1864; H04L 5/0055; H04L 1/1822; H04L 1/1854; H04L 1/1861
See application file for complete search history.

(56) References Cited

U.S. PATENT DOCUMENTS

| | | | | |
|---|---|---|---|---|
| 2023/0056251 A1* | 2/2023 | Lin | ........................ | H04L 1/1854 |
| 2023/0239895 A1* | 7/2023 | Yang | ..................... | H04L 5/0053 |
| | | | | 370/329 |
| 2024/0204958 A1* | 6/2024 | Li | ............................. | H04L 1/16 |

OTHER PUBLICATIONS

PCT Written opinion for International Application No. PCT/CN2021/136909 dated Sep. 2, 2022.
"HARQ-ACK Enhancements for Rel-17 URLLC/IIoT" of OPPO, 3GPP TSG RAN WG1 #104b-e R1-2102392 dated Apr. 7, 2021.
"Discussion on HARQ Enhancements" of OPPO, 3GPP TSG RAN WG1 #107-e R1-2111316 dated Nov. 5, 2021.
"HARQ-ACK Enhancements for IIoT/URLLC" of Ericsson, 3GPP TSG RAN WG1 #107-e R1-2111188 dated Nov. 6, 2021.
"Moderator summary #3 on HARQ-ACK feedback enhancements for NR Rel-17 URLLC/IIoT" of Moderator(Nokia), 3GPP TSG-RAN WG1 Meeting #106-e e-Meeting R1-2108546 dated Aug. 16-27, 2021.

* cited by examiner

100

Terminal device 1200

Determining module 1210

Receiving module 1220

Network device 1300

First sending module 1310

Second sending module 1320

Processing module 1330

Network device 1400

First sending module 1410

Second sending module 1420

WIRELESS COMMUNICATION METHOD, TERMINAL DEVICE, AND NETWORK DEVICE

CROSS-REFERENCE TO RELATED APPLICATIONS

This application is a continuation of International Application No. PCT/CN2021/136909, filed on Dec. 9, 2021, the disclosure of which is hereby incorporated by reference in its entirety.

TECHNICAL FIELD

This application relates to the field of communications technologies, and more specifically, to a wireless communication method, a terminal device, and a network device.

RELATED ART

Assuming that first feedback information corresponding to a first physical downlink shared channel (PDSCH) is deferred for transmission, and a number of a second PDSCH (a transmission time of the second PDSCH is later than that of the first PDSCH) received by a terminal device is the same as a number of a hybrid automatic repeat request (HARQ) process carried in the first PDSCH, a HARQ process conflict occurs (that is, the HARQ process has been used again for transmitting data, and the first feedback information has been invalid). In this scenario, an existing protocol requires the terminal device to discard the first feedback information (that is, discard unnecessary feedback information). However, this requirement sometimes may be impossible for the terminal device.

SUMMARY

To solve the foregoing problem, this application provides a wireless communication method, a terminal device, and a network device.

In a first aspect, a wireless communication method is provided and includes: determining, by a terminal device, a first physical channel or a first time unit in which a first physical channel is located, where the first physical channel is used to transmit first feedback information corresponding to a first PDSCH, the first time unit is later than a second time unit, and the second time unit is a time unit determined based on pre-configured information and used to transmit the first feedback information; receiving, by the terminal device, a second PDSCH, where HARQ process number carried in the second PDSCH is the same as HARQ process number carried in the first PDSCH; and determining, by the terminal device, an operation for the first feedback information based on a time domain position associated with the second PDSCH.

In a second aspect, a wireless communication method is provided and includes: determining, by a terminal device, a first physical channel or a first time unit in which a first physical channel is located, where the first physical channel is used to transmit first feedback information corresponding to a first PDSCH, the first time unit is later than a second time unit, and the second time unit is a time unit determined based on pre-configured information and used to transmit the first feedback information; and receiving, by the terminal device, a second PDSCH, where a time domain position associated with the second PDSCH meets a first condition, and HARQ process number carried in the second PDSCH is different from HARQ process number carried in the first PDSCH.

In a third aspect, a wireless communication method is provided and includes: sending, by a network device, a first PDSCH, where first feedback information corresponding to the first PDSCH is transmitted by using a first physical channel, a first time unit in which the first physical channel is located is later than a second time unit, and the second time unit is a time unit determined based on pre-configured information and used to transmit the first feedback information; and sending, by the network device, a second PDSCH, where HARQ process number carried in the second PDSCH is the same as HARQ process number carried in the first PDSCH; and determining, by the network device, an operation for the first feedback information based on a time domain position associated with the second PDSCH.

In a fourth aspect, a wireless communication method is provided and includes: sending, by a network device, a first PDSCH, where first feedback information corresponding to the first PDSCH is transmitted by using a first physical channel, a first time unit in which the first physical channel is located is later than a second time unit, and the second time unit is a time unit determined based on pre-configured information and used to transmit the first feedback information; and receiving, by the network device, a second PDSCH, where a time domain position associated with the second PDSCH meets a first condition, and HARQ process number carried in the second PDSCH is different from HARQ process number carried in the first PDSCH.

In a fifth aspect, a terminal device is provided and includes: a first determining module, configured to determine a first physical channel or a first time unit in which a first physical channel is located, where the first physical channel is used to transmit first feedback information corresponding to a first PDSCH, the first time unit is later than a second time unit, and the second time unit is a time unit determined based on pre-configured information and used to transmit the first feedback information; a receiving module, configured to receive a second PDSCH, where HARQ process number carried in the second PDSCH is the same as HARQ process number carried in the first PDSCH; and a second determining module, configured to determine an operation for the first feedback information based on a time domain position associated with the second PDSCH.

In a sixth aspect, a terminal device is provided and includes: a determining module, configured to determine a first physical channel or a first time unit in which a first physical channel is located, where the first physical channel is used to transmit first feedback information corresponding to a first PDSCH, the first time unit is later than a second time unit, and the second time unit is a time unit determined based on pre-configured information and used to transmit the first feedback information; and a receiving module, configured to receive a second PDSCH, where a time domain position associated with the second PDSCH meets a first condition, and HARQ process number carried in the second PDSCH is different from HARQ process number carried in the first PDSCH.

In a seventh aspect, a network device is provided and includes: a first sending module, configured to send a first PDSCH, where first feedback information corresponding to the first PDSCH is transmitted by using a first physical channel, a first time unit in which the first physical channel is located is later than a second time unit, and the second time unit is a time unit determined based on pre-configured information and used to transmit the first feedback information; a second sending module, configured to send a second PDSCH, where HARQ process number carried in the second PDSCH is the same as HARQ process number carried in the first PDSCH; and a receiving module, configured to determine an operation for the first feedback information based on a time domain position associated with the second PDSCH.

In an eighth aspect, a network device is provided and includes: a first sending module, configured to send a first PDSCH, where first feedback information corresponding to the first PDSCH is transmitted by using a first physical channel, a first time unit in which the first physical channel is located is later than a second time unit, and the second time unit is a time unit determined based on pre-configured information and used to transmit the first feedback information; and a second sending module, configured to send a second PDSCH, where a time domain position associated with the second PDSCH meets a first condition, and HARQ process number carried in the second PDSCH is different from HARQ process number carried in the first PDSCH.

According to a ninth aspect, a terminal device is provided and includes a memory and a processor, where the memory is configured to store a program, and the processor is configured to invoke the program in the memory to execute the method according to any one of the first aspect to the fourth aspect.

According to a tenth aspect, a network device is provided and includes a memory and a processor, where the memory is configured to store a program, and the processor is configured to invoke the program in the memory to execute the method according to any one of the first aspect to the fourth aspect.

According to an eleventh aspect, an apparatus is provided and includes a processor, configured to invoke a program from a memory to execute the method according to any one of the first aspect to the fourth aspect.

According to a twelfth aspect, a chip is provided and includes a processor, configured to invoke a program from a memory to cause a device installed with the chip to execute the method according to any one of the first aspect to the fourth aspect.

According to a thirteenth aspect, a computer-readable storage medium is provided, where a program is stored on the computer, and the program causes a computer to execute the method according to any one of the first aspect to the fourth aspect.

According to a fourteenth aspect, a computer program product is provided and includes a program, where the program causes a computer to execute the method according to any one of the first aspect to the fourth aspect.

According to a fifteenth aspect, a computer program is provided, where the computer program causes a computer to execute the method according to any one of the first aspect to the fourth aspect.

DESCRIPTION OF EMBODIMENTS

Communications System

Figure 1:
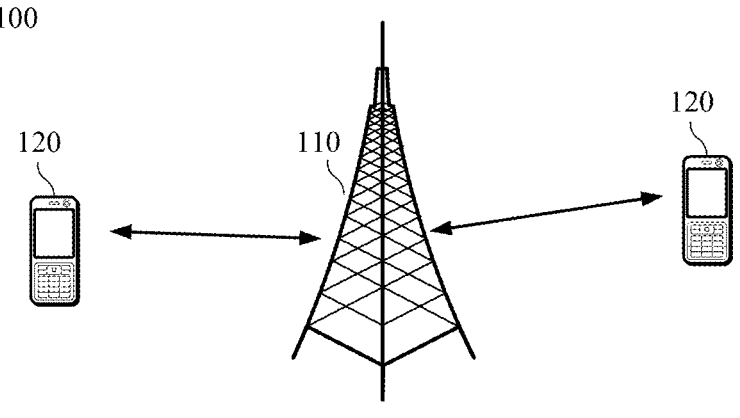
FIG. 1 is a system architecture diagram of a wireless communications system to which embodiments of this application are applicable.

FIG. 1 shows an example of a wireless communications system 100 to which embodiments of this application are applicable. The wireless communications system 100 may include a network device 110 and a terminal device 120. The network device 110 may be a device that communicates with the terminal device 120. The network device 110 may provide communication coverage for a specific geographic area, and may communicate with the terminal device 120 located within the coverage.

FIG. 1 exemplarily shows one network device and two terminals. Optionally, the wireless communications system 100 may include a plurality of network devices, and another number of terminal devices may be included in the coverage of each network device, which is not limited in embodiments of this application.

Optionally, the wireless communications system 100 may further include other network entities such as a network controller and a mobility management entity, which is not limited in the embodiments of this application.

It should be understood that technical solutions of the embodiments of this application may be applied to various communications systems, such as a 5$^{th}$ generation (5G) system or a new radio (NR) system, a long term evolution (LTE) system, an LTE frequency division duplex (FDD) system, and LTE time division duplex (TDD). The technical solutions provided in this application may further be applied to a future communications system, such as a 6$^{th}$ generation mobile communications system or a satellite communications system.

The terminal device in the embodiments of this application may also be referred to as a user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, a user apparatus or the like. The terminal device in the embodiments of this application may be a device providing a user with voice and/or data connectivity and capable of connecting people, objects, and machines, such as a handheld device or vehicle-mounted device having a wireless connection function. The terminal device in the embodiments of this application may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the UE may be used to act as a base station. For example, the UE may act as a scheduling entity, which provides a sidelink signal between UEs in V2X or D2D, or the like. For example, a cellular phone and a vehicle communicate with each other by using a sidelink signal. A cellular phone and a smart home device communicate with each other, without relaying a communication signal by using a base station.

The network device in the embodiments of this application may be a device for communicating with the terminal device. The network device may also be referred to as an access network device or a wireless access network device. For example, the network device may be a base station. The network device in the embodiments of this application may be a radio access network (RAN) node (or device) that connects the terminal device to a wireless network. The base station may broadly cover various names in the following, or may be interchangeable with one of the following names, for example: a NodeB, an evolved NodeB (eNB), a next generation NodeB (gNB), a relay station, an access point, a transmitting and receiving point (TRP), a transmitting point (TP), a master MeNB, a secondary SeNB, a multi-standard radio (MSR) node, a home base station, a network controller, a radio node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, or the like. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in device to device (D2D), vehicle-to-everything (V2X), and machine-to-machine (M2M) communications, a network-side device in a 6G network, a device that functions as a base station in a future communications system, or the like. The base station may support networks of the same or different access technologies. A specific technology and specific device form used by the network device are not limited in the embodiments of this application.

The base station may be fixed or mobile. For example, a helicopter or an unmanned aerial vehicle may be configured to act as a mobile base station, and one or more cells may move depending on a position of the mobile base station. In other examples, a helicopter or an unmanned aerial vehicle may be configured to serve as a device in communication with another base station.

In some deployments, the network device in the embodiments of this application may be a CU or a DU, or the network device includes a CU and a DU. The gNB may further include an AAU.

The network device and the terminal device may be deployed on land, including being indoors or outdoors, handheld, or in-vehicle, may be deployed on a water surface, or may be deployed on a plane, a balloon, or a satellite in the air. In the embodiments of this application, a scenario where the network device and the terminal device are located is not limited.

It should be understood that the communications device involved in this application may be a network device, or may be a terminal device. For example, the first communications device is a network device, and the second communications device is a terminal device. For another example, the first communications device is a terminal device, and the second communications device is a network device. For another example, both the first communications device and the second communications device are network devices, or both are terminal devices.

It should be understood that all or some of functions of the communications device in this application may also be implemented by software functions running on hardware, or by virtualization functions instantiated on a platform (for example, a cloud platform).

SPS PDSCH

In some communications systems (such as an NR system), data is transmitted in two manners: dynamic transmission and semi-persistent scheduling (SPS) transmission (also referred to as semi-static transmission). In NR Rel-15, a network device configures (for example, by using higher layer signaling) a set of SPS transmission parameters for a terminal device. The SPS transmission parameters may include one or more of the following parameters: a period, a time domain resource, a physical uplink control channel (PUCCH) resource for transmitting HARQ-ACK (or referred to as an acknowledgement (ACK)/negative acknowledgement (NACK)), or the like. The HARQ-ACK mentioned herein refers to HARQ-ACK corresponding to a SPS PDSCH, which may also be referred to as SPS HARQ-ACK.

Figure 2:
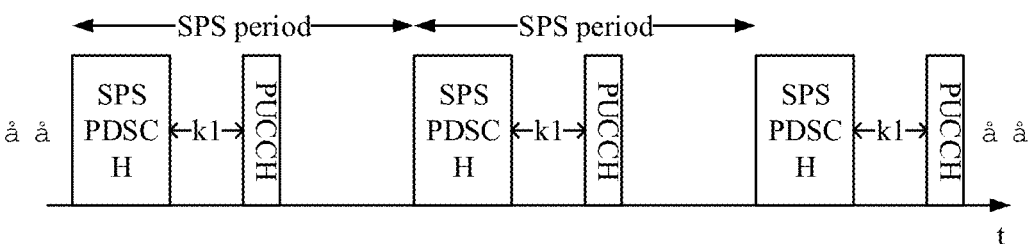
FIG. 2 is an example diagram of a position relationship between a SPS period and a PUCCH resource.

In NR Rel-15, SPS has a minimum period of 10 ms, while a maximum uplink-downlink switching period supported in NR Rel-15 is 10 ms. It can be learned that at least one determined uplink transmission resource is included in a period of 10 ms. Therefore, if properly configuring resources, the network device can always find an uplink resource to transmit the HARQ-ACK corresponding to the SPS PDSCH, as shown in FIG. 2.

In NR Rel-16, to better support ultra-reliable low delay (URLLC) transmission, a SPS period is shortened to a minimum of 1 ms. Therefore, for a SPS PDSCH, if an uplink transmission resource for HARQ-ACK corresponding to the SPS PDSCH determined based on pre-configured information is unavailable, the HARQ-ACK will not be transmitted. For example, assuming that a terminal device receives a SPS PDSCH in slot/sub-slot n, the terminal device may determine that a slot (namely, a feedback slot) used to carry HARQ-ACK corresponding to the SPS PDSCH is slot/sub-slot n+k1. That the uplink transmission resource is unavailable may mean that, for example, the slot/sub-slot n+k1 is a downlink transmission resource. K1 may be pre-configured by a network device, for example, may be configured by the network device by using higher layer signaling or may be activated by activation signaling indicated in downlink control information (DCI).

To avoid low system efficiency caused when HARQ-ACK corresponding to a SPS PDSCH is discarded, NR Rel-17 supports SPS PDSCH feedback enhancements. Specifically, NR Rel-17 supports transmission of deferring SPS HARQ-ACK (deferring HARQ-ACK). For example, assuming that a terminal device receives a SPS PDSCH in a slot/sub-slot n, if a slot/sub-slot n+k1 cannot be used to transmit HARQ-ACK corresponding to the SPS PDSCH, the HARQ-ACK may be deferred to be transmitted in a target slot/sub-slot n+k2 (k2 is greater than k1). The HARQ-ACK is also referred to as deferred HARQ-ACK. The target slot/sub-slot may include an available PUCCH resource. The available PUCCH resource may be determined based on all to-be-transmitted HARQ-ACK in the target slot/sub-slot n+k2. For a specific determining manner, reference may be made to TS 38.213.

Further, the 3rd generation partnership project (3rd generation partnership project, 3GPP) reaches following conclusion: if one SPS PDSCH carries a HARQ process (numbered as A), and HARQ-ACK corresponding to the SPS PDSCH is deferred to be transmitted (that is, the HARQ-ACK is a deferred SPS HARQ-ACK). If the terminal device receives another PDSCH, and HARQ process number carried in the PDSCH is also A, a HARQ process conflict occurs. If a HARQ process conflict occurs, it generally means that the HARQ process is occupied again to transmit data, and HARQ-ACK corresponding to data transmitted last time is invalid. Therefore, when a HARQ process conflict occurs, an existing protocol requires the terminal device to discard the deferred SPS HARQ-ACK (that is, to discard unnecessary feedback information).

HARQ-ACK Multiplexing in Transmission

NR Rel-15 specifies that if a plurality of PUCCHs overlap (time domain overlapping), or a PUCCH overlaps with a physical uplink control channel (PUSCH) (time domain overlapping), a terminal device does not simply send a plurality of physical uplink channels (PUCCHs and/or PUSCHs) to a network device separately, but multiplexes uplink control information (UCI) to one physical channel (may be a PUCCH or a PUSCH) for transmission. However, to ensure that the terminal device has enough time to perform information processing, a plurality of physical uplink channels can be multiplexed and transmitted only when the plurality of overlapping physical uplink channels (PUCCHs and/or PUSCHs) meet a multiplexing timeline (multiplexing timeline). Otherwise, the terminal device determines that an abnormal condition occurs in this case. For example, the time for the terminal device to perform information processing mentioned herein may include, for example, a time required for determining whether information carried in different physical uplink channels needs to be multiplexed, and a time required for operations such as cascading and coding on UCI when a plurality of physical uplink channels are multiplexed and transmitted. For a detailed definition of the multiplexing timeline, reference may be made to section 9.2.5 in TS 38.213.

In addition, if the terminal device has received one piece of DCI (the DCI is used for scheduling transmission of a PUSCH), and the terminal device determines that HARQ-ACK is multiplexed into the PUSCH for transmission, the terminal device does not expect to receive new DCI after the DCI, and a PUCCH used for transmitting HARQ-ACK corresponding to the new DCI and the PUSCH are located in a same slot/sub-slot.

It may be learned from the foregoing that when a HARQ process conflicts, the terminal device will discard feedback information that is deferred to be transmitted. However, impact of a processing delay of the terminal device is not considered in an existing protocol, and thus the terminal device may fail to implement discarding of the feedback information. The following uses FIG. 3 as an example for description.

Figure 3:
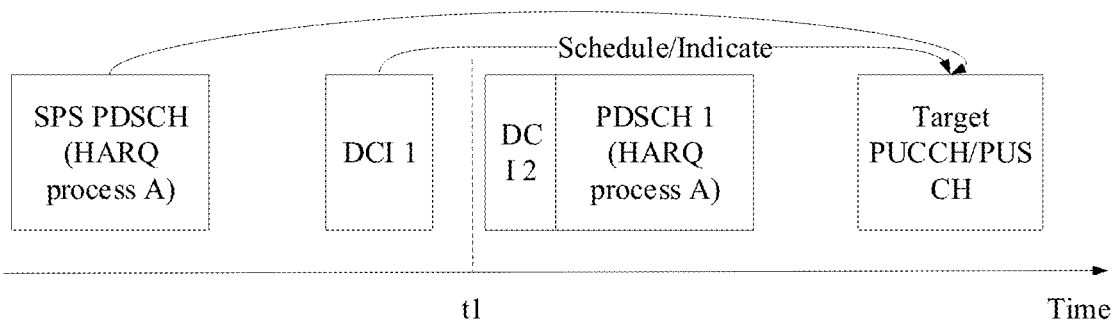
FIG. 3 is an example diagram of a scenario in which a conflict occurs between HARQ processes.

In the example illustrated in FIG. 3, a HARQ process carried in a SPS PDSCH received by a terminal device is A, and SPS HARQ-ACK corresponding to the SPS PDSCH is deferred to be transmitted. After receiving the SPS PDSCH, the terminal device also receives DCI 1. The DCI 1 is corresponding to a target PUCCH/PUSCH. For example, the DCI 1 may indicate a target PUCCH resource. For another example, the DCI 1 may schedule a target PUSCH. According to a current deferring transmission rule, the terminal device determines to transmit the SPS HARQ-ACK by using the target PUCCH/PUSCH. After that, the terminal device may start to prepare to-be-transmitted information (including the deferred SPS HARQ-ACK) of the target PUCCH/PUSCH from a time t1. The time t1 is not earlier than an ending position of the DCI 1, and is not later than a starting position of the target PUCCH/PUSCH ("position" mentioned in this application is a position of a time domain resource for carrying information or a channel). For example, the terminal device starts to perform a physical layer operation such as coding and modulation from the time t1. If after the time t1, a network device schedules a PDSCH 1 for the terminal device, and a HARQ process number of the PDSCH 1 is also A. In this case, the HARQ process conflict mentioned above occurs. In such a case, according to an existing protocol, the terminal device needs to discard the deferred SPS HARQ-ACK. However, from the time t1, the terminal device has started to process the to-be-transmitted information (including the deferred SPS HARQ-ACK) in the target PUCCH/PUSCH. In this case, if the terminal device is required to discard the deferred SPS HARQ-ACK, it may be impossible for the terminal device. This is because if the terminal device discards the deferred SPS HARQ-ACK, the terminal device needs to re-prepare the to-be-transmitted information in the target PUCCH/PUSCH. However, in consideration of a processing delay of the terminal device, remaining time may not be enough to allow the terminal device to re-prepare the to-be-transmitted information (for example, re-perform an operation such as coding or modulation).

In view of the foregoing problem, in embodiments of this application, the terminal device is not required to directly discard the first feedback information, but rather requires the terminal device to determine, based on a time domain position associated with a second PDSCH, an operation for the first feedback information, for example, whether to discard the first feedback information, so as to avoid, as far as possible, a problem in implementation caused by directly discarding the first feedback information. The following describes embodiments of this application in detail.

Figure 4:
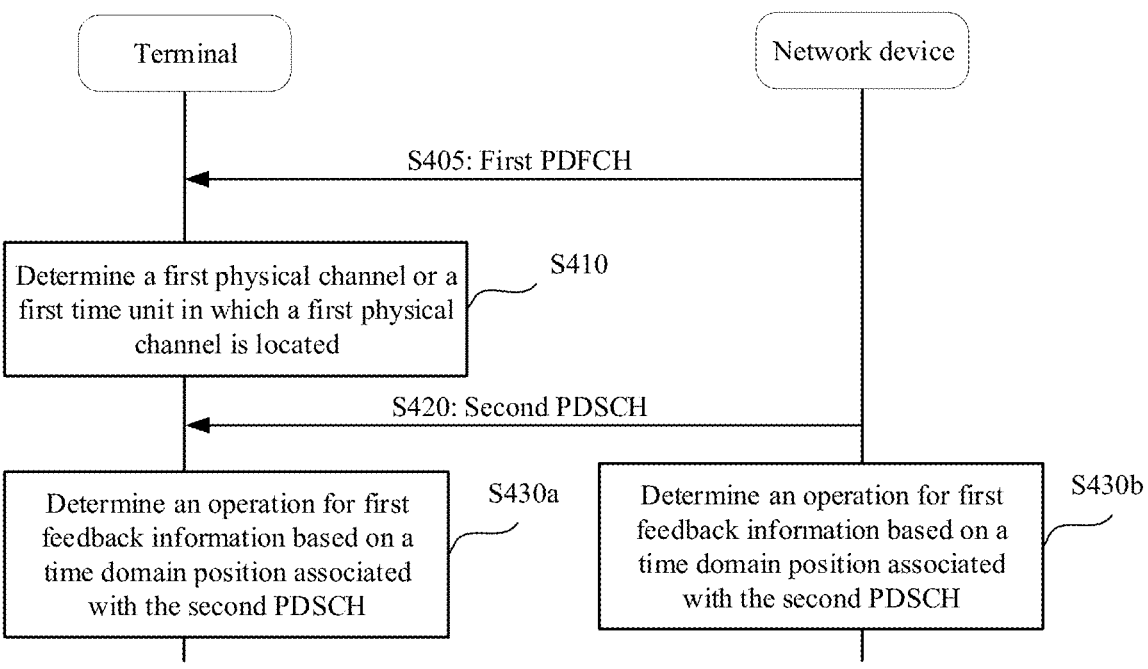
FIG. 4 is a schematic flowchart of a wireless communication method according to an embodiment of this application.

FIG. 4 is a schematic flowchart of a wireless communication method according to an embodiment of this application. The method shown in FIG. 4 is described from a perspective of interaction between a terminal device and a network device. The terminal device may be, for example, the terminal device 120 in FIG. 1, and the network device may be, for example, the network device 110 in FIG. 2.

Referring to FIG. 4, in steps S405 to S410, the network device sends a first PDSCH to the terminal device. The terminal device determines a first physical channel or a first time unit in which a first physical channel is located. The first physical channel may be used to transmit first feedback information corresponding to the first PDSCH. The first PDSCH may be, for example, a SPS PDSCH. The first physical channel may be, for example, a PUSCH or a PUCCH. The first feedback information may be, for example, HARQ-ACK (or ACK/NACK). The first PDSCH being a SPS PDSCH is used as an example. In this case, the first feedback information may be SPS HARQ-ACK.

The first physical channel is located in the first time unit. The first time unit is later than a second time unit. The second time unit is a time unit determined based on pre-configured information and used to transmit the first feedback information. In other words, based on the pre-configured information, the first feedback information should be transmitted in the first time unit. A resource, in the second time unit, used to transmit the first feedback information cannot be used for uplink transmission. In other words, a resource, in the second time unit, originally used to transmit the first feedback information and determined based on the pre-configured information cannot be used by the terminal device to actually transmit the first feedback information. For example, the second time unit is a downlink symbol. Correspondingly, a resource occupied by the first physical channel may be used for uplink transmission. For example, the first time unit is an uplink symbol and/or a flexible symbol. Therefore, the first feedback information may be understood as deferred feedback information for transmission. The first PDSCH being a SPS PDSCH is used as an example. In this case, the first feedback information may be understood as deferred SPS HARQ-ACK for transmission.

It should be noted that a basic unit of a time unit mentioned in this application (such as the first time unit and/or the second time unit mentioned above) may be set according to an actual situation. For example, the basic unit of the time unit may be a slot, a sub-slot, or one or more symbols.

An example in which the time unit is a slot/a sub-slot, and pre-configured information is a value k1 configured by the network device is used for description. Assuming that the terminal device receives the first PDSCH in a slot/sub-slot n, the first time unit may be a slot/sub-slot n+k1. However, the slot/sub-slot n+k1 is a downlink slot. Thus, the first time unit is unavailable, and the first feedback information corresponding to the first PDSCH needs to be deferred for transmission in a slot in which the first physical channel is located. The slot/sub-slot in which the first physical channel is located may be a slot/sub-slot n+k2, where k2 is greater than k1.

In step S420, the terminal device receives a second PDSCH. The second PDSCH may be a PDSCH received by the terminal device after the first PDSCH. The second PDSCH may be a SPS PDSCH or a PDSCH scheduled by DCI (or referred to as a dynamically scheduled PDSCH). HARQ process number carried in the second PDSCH is the same as HARQ process number carried in the first PDSCH. It may be learned that the HARQ process conflict mentioned above occurs between the first PDSCH and the second PDSCH.

In step S430a, the terminal device determines an operation for the first feedback information based on a time domain position associated with the second PDSCH. Correspondingly, in step S430b, the network device determines an operation for the first feedback information based on the time domain position associated with the second PDSCH. For the terminal device, the operation for the first feedback information may include discarding the first feedback information or transmitting the first feedback information by using the first physical channel. For the network device, the operation for the first feedback information may include not receiving the first feedback information or receiving the first feedback information transmitted by using the first physical channel. It should be noted that, not receiving mentioned in embodiments of this application may also be replaced with one of the following: not demodulating, not decoding, neglecting, skipping (skip), and the like.

The time domain position associated with the second PDSCH may refer to a time domain position of the second PDSCH, or may refer to other information associated with the second PDSCH or a time domain position of a channel associated with the second PDSCH. The second PDSCH being a SPS PDSCH is used as an example. In this case, the time domain position associated with the second PDSCH may refer to the time domain position of the second PDSCH. For example, the time domain position associated with the second PDSCH may include one of the following time domain positions: a starting position of the second PDSCH, a starting symbol of the second PDSCH, the first symbol of the second PDSCH, an ending position of the second PDSCH, an ending symbol of the second PDSCH, and the last symbol of the second PDSCH. The second PDSCH being a PDSCH scheduled by DCI is used as an example. In this case, the time domain position associated with the second PDSCH may refer to a time domain position of the second PDSCH, or may refer to a time domain position of a second PDCCH (The second PDCCH is used to carry second DCI, and the second DCI is used to schedule the second PDSCH). For example, the time domain position associated with the second PDSCH may include one of the following time domain positions: a starting position of the second PDSCH, a starting symbol of the second PDSCH, the first symbol of the second PDSCH, an ending position of the second PDSCH, an ending symbol of the second PDSCH, the last symbol of the second PDSCH, a starting position of the second PDCCH, a starting symbol of the second PDCCH, the first symbol of the second PDCCH, an ending position of the second PDCCH, an ending symbol of the second PDCCH, and the last symbol of the second PDCCH.

There may be a plurality of implementations for the "determining an operation for the first feedback information based on a time domain position associated with the second PDSCH" in step S430a (The following mainly describes the implementations of step S430a in detail from a perspective of a terminal device; however, related description of step S430a is also applicable to step S430b, that is, is also applicable to a network device. For brevity, the description is not repeated). In some embodiments, the terminal device may determine, based on the time domain position associated with the second PDSCH, whether the terminal device has enough time to re-prepare to-be-transmitted information on the first physical channel. If the terminal device has enough time to re-prepare the to-be-transmitted information on the first physical channel, the terminal device may consider discarding the first feedback information. If the terminal device does not have enough time to re-prepare the to-be-transmitted information on the first physical channel, the terminal device may consider not discarding the first feedback information (that is, transmitting the first feedback information by using the first physical channel). The implementations of step S430a are described in more detail by using examples in the following with reference to specific Embodiment 1 to Embodiment 3. Details are not described herein.

It may be learned from the foregoing description that, an existing protocol requires the terminal device to discard deferred first feedback information when a HARQ process conflict occurs. However, this requirement may be impossible for the terminal device. This is because if the terminal device determines to transmit the first feedback information by using the first physical channel, the terminal device starts to prepare the to-be-transmitted information (for example, physical layer operations such as cascading and coding) on the first physical channel based on the first feedback information. In a preparation process of the to-be-transmitted information, if the terminal device discards the first feedback information according to a requirement of a protocol, remaining time may not be enough to re-prepare the to-be-transmitted information on the first physical channel. Therefore, in embodiments of this application, the terminal device is not required to directly discard the first feedback information, but rather requires the terminal device to consider, based on the time domain position associated with the second PDSCH, whether to discard the first feedback information, so as to avoid, as far as possible, a problem in implementation caused by directly discarding the first feedback information.

The following illustrates step S430*a* in more detail with reference to specific embodiments.

Embodiment 1

In Embodiment 1, the first physical channel is corresponding to a first PDCCH or first DCI (the first DCI is carried in the first PDCCH). That the first physical channel is corresponding to the first DCI may refer to that the first DCI indicates or is used to schedule the first physical channel. For example, the first physical channel is a PUCCH, and the first DCI may indicate a resource of the PUCCH. For another example, the first physical channel is a PUSCH, and the first DCI may be used to schedule the PUSCH.

Further, in Embodiment 1, the "determining an operation for the first feedback information based on a time domain position associated with the second PDSCH" in step S430*a* may include "determining, based on a time domain position associated with a first PDCCH and/or the time domain position associated with the second PDSCH, to discard the first feedback information or transmit the first feedback information by using a first physical channel". The time domain position associated with the first PDCCH mentioned herein may include one of the following time domain positions: a starting position of the first PDCCH, a starting symbol of the first PDCCH, the first symbol of the first PDCCH, an ending position of the first PDCCH, an ending symbol of the first PDCCH, and the last symbol of the first PDCCH.

Figure 5:
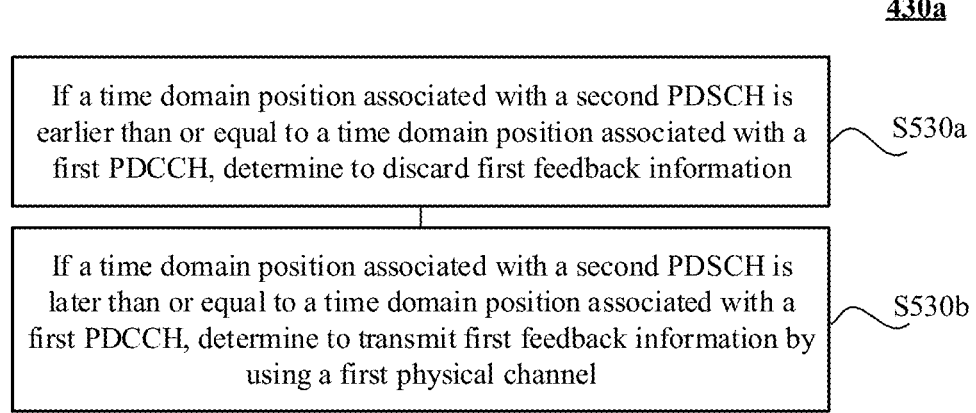
FIG. 5 is a schematic flowchart of a possible implementation of step S430$a$ in FIG. 4.

With reference to FIG. 5, the following uses examples to describe how the terminal device determines, based on the time domain position associated with the first PDCCH and the time domain position associated with the second PDSCH, whether to discard the first feedback information.

Referring to FIG. 5, in some embodiments, step S430*a* may include step S530*a* and/or step S530*b*.

In step S530*a*, if the time domain position associated with the second PDSCH is earlier than or equal to ("earlier than or equal to" mentioned in this application may alternatively be replaced with "not later than") the time domain position associated with the first PDCCH, the terminal device determines to discard the first feedback information. In other words, if the time domain position associated with the second PDSCH is earlier than or equal to the time domain position associated with the first PDCCH, it means that the terminal device may have time to re-prepare to-be-transmitted information of the first physical channel. In this case, the terminal device may discard unnecessary feedback information, which helps improve uplink transmission efficiency and reduce power consumption of the terminal device.

In an example, if a starting position (or a starting symbol or the first symbol) of the second PDSCH is earlier than or equal to an ending position (or an ending symbol or the last symbol) of the first PDCCH, the terminal device determines to discard the first feedback information.

In another example, if a starting position (or a starting symbol or the first symbol) of the second PDSCH is earlier than or equal to a starting position (or a starting symbol or the first symbol) of the first PDCCH, the terminal device determines to discard the first feedback information. It should be noted that the discarding mentioned in embodiments of this application may alternatively be replaced with one of the following: skipping (skip), clearing (clear), or releasing (release).

In still another example, if an ending position (or an ending symbol or the last symbol) of the second PDSCH is earlier than or equal to an ending position (or an ending symbol or the last symbol) of the first PDCCH, the terminal device determines to discard the first feedback information.

In yet another example, if an ending position (or an ending symbol or the last symbol) of the second PDSCH is earlier than or equal to a starting position (or a starting symbol or the first symbol) of the first PDCCH, the terminal device determines to discard the first feedback information.

The foregoing examples are applicable to that the second PDSCH is a SPS PDSCH, and is also applicable to that the second PDSCH is a PDSCH scheduled by DCI. If the second PDSCH is the PDSCH scheduled by DCI (the DCI may be referred to as second DCI, and the second DCI may be carried in a second PDCCH), step S530*a* may further use the following examples.

In an example, if an ending position (or an ending symbol or the last symbol) of the second PDCCH is earlier than or equal to an ending position (or an ending symbol or the last symbol) of the first PDCCH, the terminal device determines to discard the first feedback information.

In another example, if an ending position (or an ending symbol or the last symbol) of the second PDCCH is earlier than or equal to a starting position (or a starting symbol or the first symbol) of the first PDCCH, the terminal device determines to discard the first feedback information.

In step S530*b*, if the time domain position associated with the second PDSCH is later than or equal to ("later than or equal to" mentioned in this application may alternatively be replaced with "not earlier than") the time domain position associated with the first PDCCH, the terminal device determines to transmit the first feedback information by using the first physical channel. In other words, if the time domain position associated with the second PDSCH is later than or equal to the time domain position associated with the first PDCCH, the terminal device may not have enough time to re-prepare to-be-transmitted information of the first physical channel in time. In this case, processing that is being performed by the terminal device is maintained, so that uplink transmission can be ensured.

In an example, if a starting position (or a starting symbol or the first symbol) of the second PDSCH is later than or equal to an ending position (or an ending symbol or the last symbol) of the first PDCCH, the terminal device determines to transmit the first feedback information by using the first physical channel.

In another example, if a starting position (or a starting symbol or the first symbol) of the second PDSCH is later than or equal to a starting position (or a starting symbol or the first symbol) of the first PDCCH, the terminal device determines to transmit the first feedback information by using the first physical channel.

In still another example, if an ending position (or an ending symbol or the last symbol) of the second PDSCH is later than or equal to an ending position (or an ending symbol or the last symbol) of the first PDCCH, the terminal device determines to transmit the first feedback information by using the first physical channel.

In yet another example, if an ending position (or an ending symbol or the last symbol) of the second PDSCH is later than or equal to a starting position (or a starting symbol or the first symbol) of the first PDCCH, the terminal device determines to transmit the first feedback information by using the first physical channel.

The foregoing examples are applicable to that the second PDSCH is a SPS PDSCH, and is also applicable to that the second PDSCH is a PDSCH scheduled by DCI. If the second PDSCH is the PDSCH scheduled by DCI (the DCI may be referred to as second DCI, and the second DCI may be carried in a second PDCCH), step S530b may further use the following examples.

In an example, if an ending position (or an ending symbol or the last symbol) of the second PDCCH is later than or equal to an ending position (or an ending symbol or the last symbol) of the first PDCCH, the terminal device determines to transmit the first feedback information by using the first physical channel.

In another example, if an ending position (or an ending symbol or the last symbol) of the second PDCCH is later than or equal to a starting position (or a starting symbol or the first symbol) of the first PDCCH, the terminal device determines to transmit the first feedback information by using the first physical channel.

Embodiment 2

In Embodiment 2, the second PDSCH is a SPS PDSCH, and the time domain position associated with the second PDSCH is earlier than or equal to a time domain position associated with the first physical channel.

In Embodiment 2, the time domain position associated with the second PDSCH may include one of the following time domain positions: a starting position of the second PDSCH, a starting symbol of the second PDSCH, the first symbol of the second PDSCH, an ending position of the second PDSCH, an ending symbol of the second PDSCH, and the last symbol of the second PDSCH.

In Embodiment 2, the time domain position associated with the first physical channel may include one of the following time domain positions: a starting position of the first physical channel, a starting symbol of the first physical channel, the first symbol of the first physical channel, an ending position or an ending symbol or the last symbol of the first physical channel.

There may be a plurality of definitions of that "the time domain position associated with the second PDSCH is earlier than or equal to a time domain position associated with the first physical channel". The following provides several examples.

In an example, if a starting position (or a starting symbol or the first symbol) of the second PDSCH is earlier than or equal to an ending position (or an ending symbol or the last symbol) of the first physical channel, the terminal device determines to discard the first feedback information.

In another example, if a starting position (or a starting symbol or the first symbol) of the second PDSCH is earlier than or equal to a starting position (or a starting symbol or the first symbol) of the first physical channel, the terminal device determines to discard the first feedback information.

In still another example, if an ending position (or an ending symbol or the last symbol) of the second PDSCH is earlier than or equal to an ending position (or an ending symbol or the last symbol) of the first physical channel, the terminal device determines to discard the first feedback information.

In yet another example, if an ending position (or an ending symbol or the last symbol) of the second PDSCH is earlier than or equal to a starting position (or a starting symbol or the first symbol) of the first physical channel, the terminal device determines to discard the first feedback information.

In Embodiment 2, step S430a in FIG. 4 may include determining, by the terminal device, to discard the first feedback information. Because the second PDSCH is a SPS PDSCH, the terminal device may learn a transmission resource of the second PDSCH in advance. Therefore, if a HARQ process conflict exists between the second PDSCH and the second PDSCH, the terminal device may discard the first feedback information in advance, thereby improving uplink transmission efficiency and reducing power consumption of the terminal device.

Figure 6:
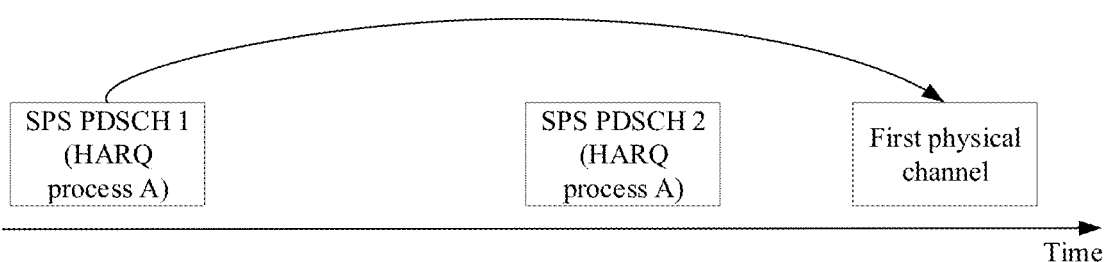
FIG. 6 is an example diagram of a scenario in which the method shown in FIG. 4 is applicable.

FIG. 6 is used as an example. It is assumed that the first PDSCH and the second PDSCH are respectively a SPS PDSCH 1 and a SPS PDSCH 2 in FIG. 6. It can be learned from FIG. 6 that numbers of HARQ processes carried in the SPS PDSCH 1 and the SPS PDSCH 2 are both A, and the HARQ conflict mentioned above exists. Because both the SPS PDSCH 1 and the SPS PDSCH 2 are scheduled in a semi-static manner, the terminal device may learn a transmission resource of the SPS PDSCH 1 and the SPS PDSCH 2 in advance. Therefore, the terminal device may determine in advance whether the terminal device will receive, after receiving the SPS PDSCH 1, the SPS PDSCH 2 whose HARQ process conflicts with that of the SPS PDSCH 1, so as to determine in advance whether a HARQ process conflict occurs. If there is a HARQ process conflict, the terminal device may discard, in advance, deferred feedback information corresponding to the SPS PDSCH 1, thereby improving uplink transmission efficiency and reducing power consumption of the terminal device.

Embodiment 3

In Embodiment 3, an interval (time interval) between the time domain position associated with the second PDSCH and the time domain position associated with the first physical channel is considered.

In Embodiment 3, the time domain position associated with the second PDSCH may refer to a time domain position of the second PDSCH, or may refer to a time domain position of a second PDCCH (The second PDCCH is used to carry second DCI, and the second DCI is used to schedule the second PDSCH). For example, the time domain position associated with the second PDSCH may include one of the following time domain positions: a starting position of the second PDSCH, a starting symbol of the second PDSCH, the first symbol of the second PDSCH, an ending position of the second PDSCH, an ending symbol of the second PDSCH, the last symbol of the second PDSCH, a starting position of the second PDCCH, a starting symbol of the second PDCCH, the first symbol of the second PDCCH, an ending position of the second PDCCH, an ending symbol of the second PDCCH, and the last symbol of the second PDCCH.

In Embodiment 3, the time domain position associated with the first physical channel may include one of the following time domain positions: a starting position of the first physical channel, a starting symbol of the first physical channel, the first symbol of the first physical channel, an ending position of the first physical channel, an ending symbol of the first physical channel, and the last symbol of the first physical channel.

The interval between the time domain position associated with the second PDSCH and the time domain position associated with the first physical channel may be measured, for example, by using a first threshold. The first threshold may be a duration. The first threshold may be predefined in a protocol, or may be configured by a network device. If the interval between the time domain position associated with the second PDSCH and the time domain position associated with the first physical channel is greater than or equal to the first threshold, it indicates that the terminal device may still have time to re-prepare to-be-transmitted information in the first physical channel. In this case, the terminal device may discard unnecessary feedback information (that is, the first feedback information mentioned above), which helps improve uplink transmission efficiency and reduce power consumption of the terminal device. If the interval between the time domain position associated with the second PDSCH and the time domain position associated with the first physical channel is less than or equal to the first threshold, it indicates that the terminal device may not have enough time to re-prepare the to-be-transmitted information in the first physical channel. In this case, processing that is being performed by the terminal device for the to-be-transmitted information in the first physical channel may be maintained, so as to ensure uplink transmission.

The first threshold may be determined based on a first time. The first time may include, for example, one or more of the following times: a preparation time for a PUCCH; a preparation time for UCI; and a preparation time for a PUSCH. In an example, the first threshold may be greater than or equal to the first time. The preparation time for the PUSCH, for example, may be represented by using a parameter $T_{proc,2}$. For a definition of $T_{proc,2}$, reference may be made to TS 38.214. It should be noted that the first time mentioned above may be understood as a period of time. Therefore, in some embodiments, the first time may be replaced with a first duration. For example, the preparation time for the PUCCH may be understood as a preparation duration for the PUCCH (namely, a time interval between starting preparation of the PUCCH and ending preparation of the PUCCH).

Figure 7:
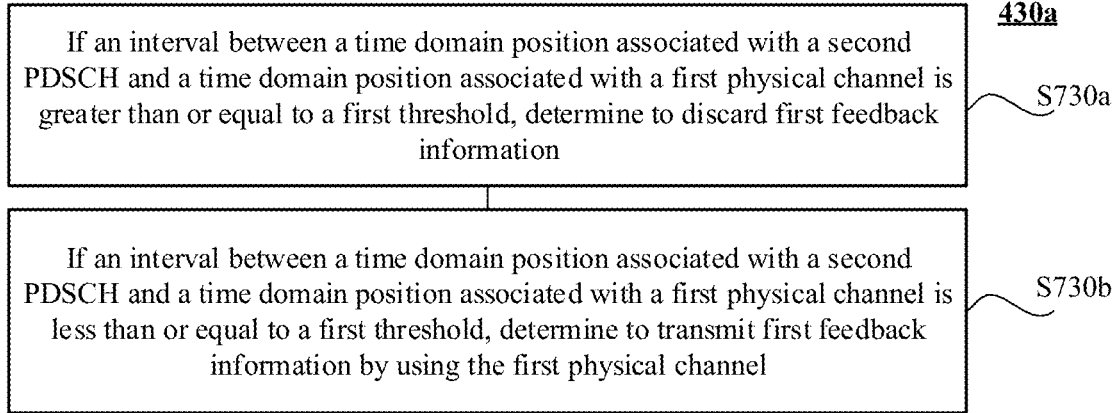
FIG. 7 is a schematic flowchart of another possible implementation of step S430$a$ in FIG. 4.

In some embodiments, referring to FIG. 7, step S430a in FIG. 4 may include step S730a and/or step S730b.

In step S730a, if the interval between the time domain position associated with the second PDSCH and the time domain position associated with the first physical channel is greater than or equal to the first threshold, the terminal device determines to discard the first feedback information.

In an example, if an interval between a starting position (or a starting symbol or the first symbol) of the second PDSCH and an ending position (or an ending symbol or the last symbol) of the first physical channel is greater than or equal to the first threshold, the terminal device determines to discard the first feedback information.

In another example, if an interval between a starting position (or a starting symbol or the first symbol) of the second PDSCH and a starting position (or a starting symbol or the first symbol) of the first physical channel is greater than or equal to the first threshold, the terminal device determines to discard the first feedback information.

In still another example, if an interval between an ending position (or an ending symbol or the last symbol) of the second PDSCH and an ending position (or an ending symbol or the last symbol) of the first physical channel is greater than or equal to the first threshold, the terminal device determines to discard the first feedback information.

In yet another example, if an interval between an ending position (or an ending symbol or the last symbol) of the second PDSCH and a starting position (or a starting symbol or the first symbol) of the first physical channel is greater than or equal to the first threshold, the terminal device determines to discard the first feedback information.

The foregoing examples are applicable to that the second PDSCH is a SPS PDSCH, and is also applicable to that the second PDSCH is a PDSCH scheduled by DCI. If the second PDSCH is the PDSCH scheduled by DCI (the DCI may be referred to as second DCI, and the second DCI may be carried in a second PDCCH), step S730a may further use the following examples.

In an example, if an interval between an ending position (or an ending symbol or the last symbol) of the second PDCCH and an ending position (or an ending symbol or the last symbol) of the first physical channel is greater than or equal to the first threshold, the terminal device determines to discard the first feedback information.

In another example, if an interval between an ending position (or an ending symbol or the last symbol) of the second PDCCH and a starting position (or a starting symbol or the first symbol) of the first physical channel is greater than or equal to the first threshold, the terminal device determines to discard the first feedback information.

In step S730b, if an interval between the time domain position associated with the second PDSCH and the time domain position associated with the first physical channel is less than or equal to the first threshold, the terminal device transmits the first feedback information by using the first physical channel.

In an example, if an interval between a starting position (or a starting symbol or the first symbol) of the second PDSCH and an ending position (or an ending symbol or the last symbol) of the first physical channel is less than or equal to the first threshold, the terminal device determines to transmit the first feedback information by using the first physical channel.

In another example, if an interval between a starting position (or a starting symbol or the first symbol) of the second PDSCH and a starting position (or a starting symbol or the first symbol) of the first physical channel is less than or equal to the first threshold, the terminal device determines to transmit the first feedback information by using the first physical channel.

In still another example, if an interval between an ending position (or an ending symbol or the last symbol) of the second PDSCH and an ending position (or an ending symbol or the last symbol) of the first physical channel is less than or equal to the first threshold, the terminal device determines to transmit the first feedback information by using the first physical channel.

In yet another example, if an interval between an ending position (or an ending symbol or the last symbol) of the second PDSCH and a starting position (or a starting symbol or the first symbol) of the first physical channel is less than or equal to the first threshold, the terminal device determines to transmit the first feedback information by using the first physical channel.

The foregoing examples are applicable to that the second PDSCH is a SPS PDSCH, and is also applicable to that the second PDSCH is a PDSCH scheduled by DCI. If the second PDSCH is the PDSCH scheduled by DCI (the DCI may be referred to as second DCI, and the second DCI may be carried in a second PDCCH), step S730b may further use the following examples.

In an example, if an interval between an ending position (or an ending symbol or the last symbol) of the second PDCCH and an ending position (or an ending symbol or the last symbol) of the first physical channel is less than or equal to the first threshold, the terminal device determines to transmit the first feedback information by using the first physical channel.

In another example, if an interval between an ending position (or an ending symbol or the last symbol) of the second PDCCH and a starting position (or a starting symbol or the first symbol) of the first physical channel is less than or equal to the first threshold, the terminal device determines to transmit the first feedback information by using the first physical channel.

The first physical channel in Embodiment 3 may be corresponding to DCI (for example, the first physical channel is scheduled or indicated by DCI), or may not be corresponding to DCI.

Figure 8:
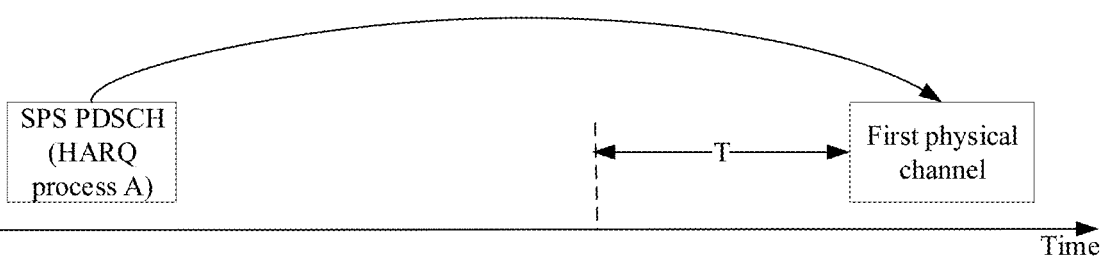
FIG. 8 is an example diagram of another scenario in which the method shown in FIG. 4 is applicable.

The following provides a specific example with reference to FIG. 8. A SPS PDSCH in FIG. 8 corresponds to the first PDSCH mentioned above. HARQ process number carried in the SPS PDSCH is A. Feedback information corresponding to the SPS PDSCH is deferred for transmission, and the first physical channel is a channel that carries the deferred feedback information. FIG. 8 further shows a time interval T. The time interval is located before a starting position of the first physical channel. The time interval T is a time interval defined by the first threshold described above. If the terminal device receives a PDSCH in the time interval T, and a HARQ process number of the PDSCH is also A, the terminal device may not discard the feedback information corresponding to the SPS PDSCH. If the terminal device receives a PDSCH before the time interval T, and a HARQ process number of the PDSCH is also A, the terminal device may discard the feedback information corresponding to the SPS PDSCH.

Figure 9:
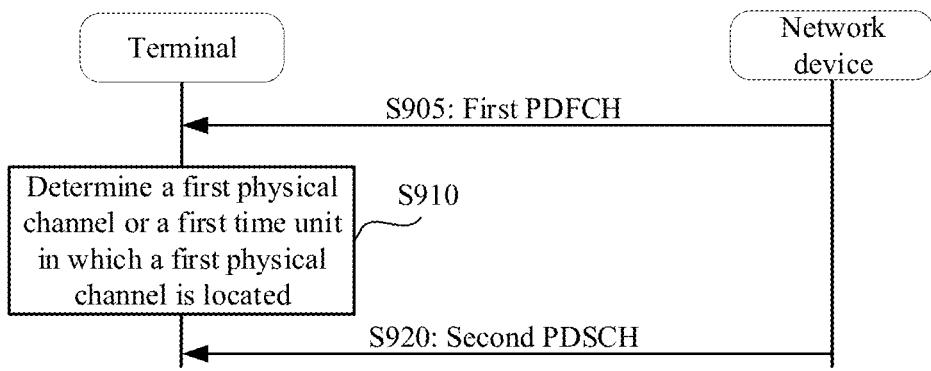
FIG. 9 is a schematic flowchart of a wireless communication method according to another embodiment of this application.

FIG. 9 is a schematic flowchart of a wireless communication method according to another embodiment of this application. The method shown in FIG. 9 is described from a perspective of interaction between a terminal device and a network device. The terminal device may be, for example, the terminal device 110 in FIG. 1, and the network device may be, for example, the network device 120 in FIG. 2.

Referring to FIG. 9, in steps S905 to S910, the network device sends a first PDSCH to the terminal device. The terminal device determines a first physical channel or a first time unit in which a first physical channel is located. The first physical channel may be used to transmit first feedback information corresponding to the first PDSCH. The first PDSCH may be, for example, a SPS PDSCH. The first physical channel may be, for example, a PUSCH or a PUCCH. The first feedback information may be, for example, HARQ-ACK (or ACK/NACK). The first PDSCH being a SPS PDSCH is used as an example. In this case, the first feedback information may be SPS HARQ-ACK.

The first physical channel is located in the first time unit. The first time unit is later than a second time unit. The second time unit is a time unit determined based on pre-configured information and used to transmit the first feedback information. In other words, based on the pre-configured information, the first feedback information should be transmitted in the first time unit. However, due to some reasons (for example, a transmission resource on the first time unit is unavailable), the first feedback information is deferred to be translated (in the second time unit). Therefore, the first feedback information may be understood as deferred feedback information for transmission. The first PDSCH being a SPS PDSCH is used as an example. In this case, the first feedback information may be understood as deferred SPS HARQ-ACK (deferred SPS HARQ-ACK) for transmission. An example in which the time unit is a slot/a sub-slot, and pre-configured information is a value k1 configured by the network device is used for description. Assuming that the terminal device receives the first PDSCH in a slot/sub-slot n, the first time unit may be a slot/sub-slot n+k1. However, the slot/sub-slot n+k1 is a downlink slot. Thus, the first time unit is unavailable, and the first feedback information corresponding to the first PDSCH needs to be deferred for transmission in a slot in which the first physical channel is located. The slot/sub-slot in which the first physical channel is located may be a slot/sub-slot n+k2, where k2 is greater than k1.

In step S920, the terminal device receives a second PDSCH. The second PDSCH may be a PDSCH received by the terminal device after the first PDSCH. The second PDSCH may be a PDSCH scheduled by second DCI. The second DCI is carried in a second PDCCH. The time domain position associated with the second PDSCH meets a first condition, and HARQ process number carried in the second PDSCH is different from HARQ process number carried in the first PDSCH (or if a time domain position associated with the second PDSCH meets a first condition, HARQ process number carried in the second PDSCH is different from HARQ process number carried in the first PDSCH). In other words, if the time domain position associated with the second PDSCH meets the first condition, the terminal device does not expect that a HARQ process carried in the second PDSCH is the same as a HARQ process carried in the first PDSCH.

The time domain position associated with the second PDSCH may refer to a time domain position of the second PDSCH, or may refer to other information associated with the second PDSCH or a time domain position of a channel associated with the second PDSCH. The second PDSCH being a SPS PDSCH is used as an example. In this case, the time domain position associated with the second PDSCH may refer to the time domain position of the second PDSCH. For example, the time domain position associated with the second PDSCH may include one of the following time domain positions: a starting position of the second PDSCH, a starting symbol of the second PDSCH, the first symbol of the second PDSCH, an ending position of the second PDSCH, an ending symbol of the second PDSCH, and the last symbol of the second PDSCH. The second PDSCH being a PDSCH scheduled by DCI is used as an example. In this case, the time domain position associated with the second PDSCH may refer to a time domain position of the second PDSCH, or may refer to a time domain position of the second PDCCH. For example, the time domain position associated with the second PDSCH may include one of the following time domain positions: a starting position of the second PDSCH, a starting symbol of the second PDSCH, the first symbol of the second PDSCH, an ending position of the second PDSCH, an ending symbol of the second PDSCH, the last symbol of the second PDSCH, a starting position of the second PDCCH, a starting symbol of the second PDCCH, the first symbol of the second PDCCH, an ending position of the second PDCCH, an ending symbol of the second PDCCH, and the last symbol of the second PDCCH.

There may be a plurality of definitions of that "the time domain position associated with the second PDSCH meets a first condition". With reference to Embodiment 4 and Embodiment 5, the following provides two possible definition manners.

Embodiment 4

In Embodiment 4, the first physical channel is corresponding to a first PDCCH or first DCI (the first DCI is carried in the first PDCCH). That the first physical channel is corresponding to the first DCI may refer to that the first DCI indicates or is used to schedule the first physical channel. For example, the first physical channel is a PUCCH, and the first DCI may indicate a resource of the PUCCH. For another example, the first physical channel is a PUSCH, and the first DCI may be used to schedule the PUSCH. The first DCI may be carried in the first PDCCH.

That "the time domain position associated with the second PDSCH meets the first condition" may include that: the time domain position associated with the second PDSCH is later than or equal to the time domain position associated with the first PDCCH. Alternatively, the network device may schedule a PDSCH in a dynamic scheduling manner, so as to ensure that the first condition is met, thereby ensuring that the terminal device always has enough time to prepare to-be-transmitted information of the first physical channel.

The time domain position associated with the first PDCCH may include one of the following: a starting position of the first PDCCH, a starting symbol of the first PDCCH, the first symbol of the first PDCCH, an ending position of the first PDCCH, an ending symbol of the first PDCCH, and the last symbol of the first PDCCH.

In an example, the first condition may refer to that a starting position (or a starting symbol or the first symbol) of the second PDSCH is earlier than or equal to an ending position (or an ending symbol or the last symbol) of the first PDCCH.

In another example, the first condition may refer to that a starting position (or a starting symbol or the first symbol) of the second PDSCH is earlier than or equal to a starting position (or a starting symbol or the first symbol) of the first PDCCH.

In still another example, the first condition may refer to that an ending position (or an ending symbol or the last symbol) of the second PDSCH is later than or equal to an ending position (or an ending symbol or the last symbol) of the first PDCCH.

In yet another example, the first condition may refer to that an ending position (or an ending symbol or the last symbol) of the second PDSCH is later than or equal to a starting position (or a starting symbol or the first symbol) of the first PDCCH.

In an example, the first condition may refer to that an ending position (or an ending symbol or the last symbol) of the second PDCCH is later than or equal to an ending position (or an ending symbol or the last symbol) of the first PDCCH.

In another example, the first condition may refer to that an ending position (or an ending symbol or the last symbol) of the second PDCCH is later than or equal to a starting position (or a starting symbol or the last symbol) of the first PDCCH.

Figure 10:
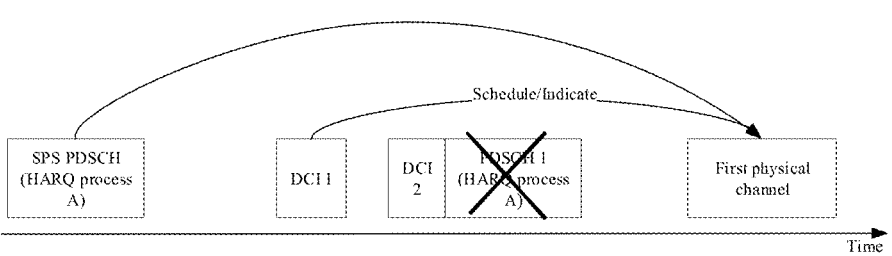
FIG. 10 is an example diagram of a scenario in which the method shown in FIG. 9 is applicable.

The following provides a specific example with reference to FIG. 10. As shown in FIG. 10, first, the terminal device receives a SPS PDSCH (corresponding to the first PDSCH described above), and a HARQ process number of the SPS PDSCH is A. Then, the terminal device receives DCI 1 (corresponding to the first DCI described above), and the first DCI is used to schedule or indicates the first physical channel. In this scenario, the terminal device does not expect to receive, after receiving the first DCI, a PDSCH 1 scheduled by using DCI 2 and carrying a HARQ process number A. Therefore, the network device also needs to avoid the foregoing case in a dynamic scheduling manner.

Embodiment 5

In Embodiment 5, the first physical channel may be corresponding to DCI, or may not be corresponding to DCI.

That "the time domain position associated with the second PDSCH meets a first condition" may include that: an interval between the time domain position associated with the second PDSCH and a time domain position associated with the first physical channel is less than or equal to a first threshold (The first threshold may be predefined in a protocol, or may be configured by a network device). Alternatively, the network device may schedule a PDSCH in a dynamic scheduling manner, so as to ensure that the first condition is met, thereby ensuring that the terminal device always has enough time to prepare to-be-transmitted information of the first physical channel.

The time domain position associated with the first physical channel may include one of the following: a starting position of the first physical channel, a starting symbol of the first physical channel, the first symbol of the first physical channel, an ending position of the first physical channel, an ending symbol of the first physical channel, and the last symbol of the first physical channel.

The first threshold may be determined based on a first time. The first time may include, for example, one or more of the following times: a preparation time for a PUCCH; a preparation time for UCI; and a preparation time for a PUSCH. In an example, the first threshold may be greater than or equal to the first time. The preparation time for the PUSCH, for example, may be represented by using a parameter $T_{proc,2}$. For a definition of $T_{proc,2}$, reference may be made to TS 38.214.

In an example, the first condition may refer to that an interval between an ending position (or a starting symbol or the first symbol) of the second PDSCH and a starting position (or an ending symbol or the last symbol) of the first physical channel is less than or equal to the first threshold.

In another example, the first condition may refer to that an interval between a starting position (or a starting symbol or the last symbol) of the second PDSCH and a starting position (or an ending symbol or the last symbol) of the first physical channel is less than or equal to the first threshold.

In still another example, the first condition may refer to that an interval between an ending position (or an ending symbol or the last symbol) of the second PDCCH and a starting position (or an ending symbol or the last symbol) of the first physical channel is less than or equal to the first threshold.

The foregoing describes method embodiments of this application in detail with reference to FIG. 1 to FIG. 10. The following describes apparatus embodiments of this application in detail with reference to FIG. 11 to FIG. 15. It should be understood that the description of the method embodiments corresponds to the description of the apparatus embodiments, and therefore, for parts that are not described in detail, reference may be made to the foregoing method embodiments.

Figure 11:
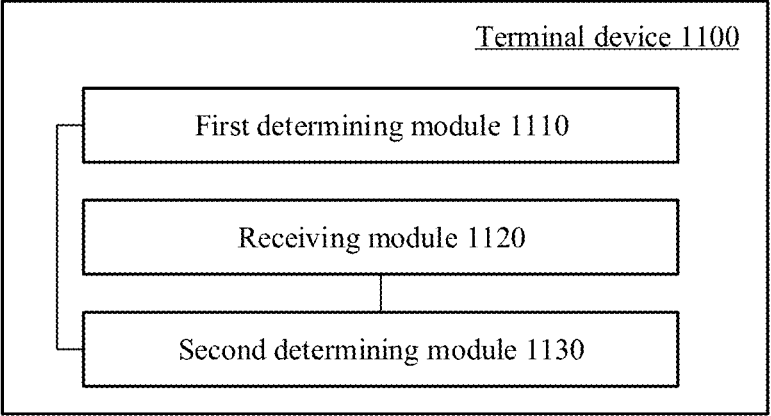
FIG. 11 is a schematic structural diagram of a terminal device according to an embodiment of this application.

FIG. 11 is a schematic structural diagram of a terminal device according to an embodiment of this application. The terminal device 1100 in FIG. 11 includes a first determining module 1110, a receiving module 1120, and a second determining module 1130.

The first determining module 1110 may be configured to determine a first physical channel or a first time unit in which a first physical channel is located. The first physical channel is used to transmit first feedback information corresponding to a first PDSCH, the first time unit is later than a second time unit, and the second time unit is a time unit determined based on pre-configured information and used to transmit the first feedback information.

The receiving module 1120 may be configured to receive a second PDSCH. HARQ process number carried in the second PDSCH is the same as HARQ process number carried in the first PDSCH.

The second determining module 1130 may be configured to determine an operation for the first feedback information based on a time domain position associated with the second PDSCH.

Optionally, the second determining module 1130 may be configured to: if the time domain position associated with the second PDSCH is earlier than or equal to a time domain position associated with a first PDCCH, determine to discard the first feedback information; or if the time domain position associated with the second PDSCH is later than or equal to a time domain position associated with a first PDCCH, determine to transmit the first feedback information by using the first physical channel, where the first PDCCH is used to carry first DCI, and the first DCI is used to schedule or indicate the first physical channel.

Optionally, the time domain position associated with the first PDCCH includes: a starting position, a starting symbol, or the first symbol of the first PDCCH, or an ending position, an ending symbol, or the last symbol of the first PDCCH.

Optionally, the time domain position associated with the second PDSCH includes: a starting position, a starting symbol, or the first symbol of the second PDSCH; or an ending position, an ending symbol, or the last symbol of the second PDSCH; or a starting position, a starting symbol, or the first symbol of a second PDCCH; or an ending position, an ending symbol, or the last symbol of a second PDCCH, where the second PDCCH is used to carry second DCI, and the second DCI is used to schedule the second PDSCH.

Optionally, the second determining module 1130 may be configured to determine to discard the first feedback information, where the second PDSCH is a SPS PDSCH, and the time domain position associated with the second PDSCH is earlier than or equal to a time domain position associated with the first physical channel.

Optionally, the second determining module 1130 may be configured to: determine to discard the first feedback information, where an interval between the time domain position associated with the second PDSCH and a time domain position associated with the first physical channel is greater than or equal to a first threshold; or determine to transmit the first feedback information by using the first physical channel, where an interval between the time domain position associated with the second PDSCH and a time domain position associated with the first physical channel is less than or equal to a first threshold.

Optionally, the first threshold is determined based on a first time, and the first time includes one or more of the following times: a preparation time for a PUCCH; a preparation time for UCI; and a preparation time for a PUSCH.

Optionally, the first threshold is greater than or equal to the first time.

Optionally, the time domain position associated with the second PDSCH includes: a starting position, a starting symbol, or the first symbol of the second PDSCH; or an ending position, an ending symbol, or the last symbol of the second PDSCH.

Optionally, the time domain position associated with the first physical channel includes: a starting position, a starting symbol, or the first symbol of the first physical channel, or an ending position, an ending symbol, or the last symbol of the first physical channel.

Optionally, the second PDSCH is a SPS PDSCH or a PDSCH scheduled by DCI.

Optionally, the first PDSCH is a SPS PDSCH.

Optionally, the first physical channel is a PUSCH or a PUCCH.

Optionally, the operation for the first feedback information includes discarding the first feedback information, or transmitting the first feedback information by using the first physical channel.

Figure 12:
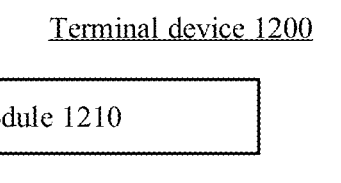
FIG. 12 is a schematic structural diagram of a terminal device according to another embodiment of this application.

FIG. 12 is a schematic structural diagram of a terminal device according to another embodiment of this application. The terminal device 1200 in FIG. 12 includes a determining module 1210 and a receiving module 1220.

The determining module 1210 may be configured to determine a first physical channel or a first time unit in which a first physical channel is located. The first physical channel is used to transmit first feedback information corresponding to a first PDSCH, the first time unit is later than a second time unit, and the second time unit is a time unit determined based on pre-configured information and used to transmit the first feedback information.

The receiving module 1220 may be configured to receive a second PDSCH. A time domain position associated with the second PDSCH meets a first condition, and HARQ process number carried in the second PDSCH is different from HARQ process number carried in the first PDSCH.

Optionally, that the time domain position associated with the second PDSCH meets a first condition includes: the time domain position associated with the second PDSCH is later than or equal to a time domain position associated with a first PDCCH, where the first PDCCH is used to carry first DCI, and the first DCI is used to schedule or indicate the first physical channel.

Optionally, the time domain position associated with the first PDCCH includes: a starting position or a starting symbol or the first symbol of the first PDCCH, or an ending position or an ending symbol or the last symbol of the first PDCCH.

Optionally, that the time domain position associated with the second PDSCH meets a first condition includes: an interval between the time domain position associated with the second PDSCH and a time domain position associated with the first physical channel is less than or equal to a first threshold.

Optionally, the time domain position associated with the first physical channel includes: a starting position or a starting symbol or the first symbol of the first physical channel, or an ending position or an ending symbol or the last symbol of the first physical channel.

Optionally, the first threshold is determined based on a first time, and the first time includes one or more of the following times: a preparation time for a PUCCH; a preparation time for UCI; and a preparation time for a PUSCH.

Optionally, the first threshold is greater than or equal to the first time.

Optionally, the time domain position associated with the second PDSCH includes: a starting position, a starting symbol, or the first symbol of the second PDSCH; or an ending position, an ending symbol, or the last symbol of the second PDSCH; or a starting position, a starting symbol, or the first symbol of a second PDCCH; or an ending position, an ending symbol, or the last symbol of a second PDCCH, where the second PDCCH is used to carry second DCI, and the second DCI is used to schedule the second PDSCH.

Optionally, the first PDSCH is a SPS PDSCH.

Optionally, the second PDSCH is a SPS PDSCH or a PDSCH scheduled by DCI.

Optionally, the first physical channel is a PUSCH or a PUCCH.

Figure 13:
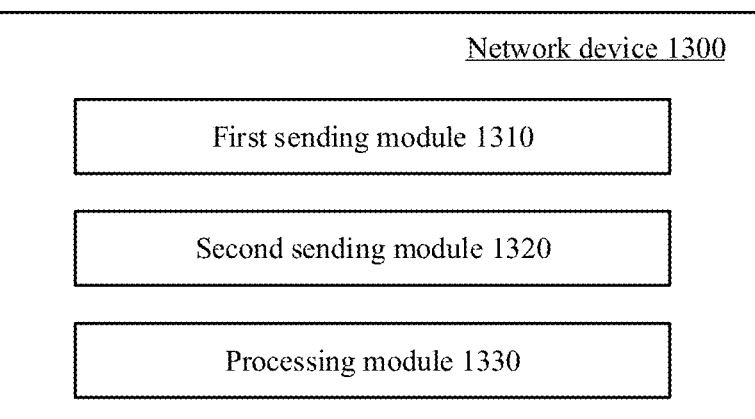
FIG. 13 is a schematic structural diagram of a network device according to an embodiment of this application.

FIG. 13 is a schematic structural diagram of a network device according to an embodiment of this application. The network device 1300 in FIG. 13 includes a first sending module 1310, a second sending module 1320, and a processing module 1330.

The first sending module 1310 may be configured to send a first PDSCH. First feedback information corresponding to the first PDSCH is transmitted by using a first physical channel, a first time unit in which the first physical channel is located is later than a second time unit, and the second time unit is a time unit determined based on pre-configured information and used to transmit the first feedback information.

The second sending module 1320 may be configured to send a second PDSCH, where a hybrid automatic repeat request HARQ process number carried in the second PDSCH is the same as HARQ process number carried in the first PDSCH.

The processing module 1330 may be configured to determine an operation for the first feedback information based on a time domain position associated with the second PDSCH.

Optionally, the processing module is configured to: if the time domain position associated with the second PDSCH is earlier than or equal to a time domain position associated with a first PDCCH, skip receiving the first feedback information; or if the time domain position associated with the second PDSCH is later than or equal to a time domain position associated with a first physical downlink control channel PDCCH, receive the first feedback information transmitted by using the first physical channel, where the first PDCCH is used to carry first downlink control information DCI, and the first DCI is used to schedule or indicate the first physical channel.

Optionally, the time domain position associated with the first PDCCH includes: a starting position or a starting symbol or the first symbol of the first PDCCH, or an ending position or an ending symbol or the last symbol of the first PDCCH.

Optionally, the time domain position associated with the second PDSCH includes: a starting position or a starting symbol or the first symbol of the second PDSCH; or an ending position or an ending symbol or the last symbol of the second PDSCH; or a starting position or a starting symbol or the first symbol of a second PDCCH; or an ending position or an ending symbol or the last symbol of a second PDCCH, where the second PDCCH is used to carry second DCI, and the second DCI is used to schedule the second PDSCH.

Optionally, the processing module is configured to skip receiving the first feedback information, where the second PDSCH is a semi-persistent scheduling SPS PDSCH, and the time domain position associated with the second PDSCH is earlier than or equal to a time domain position associated with the first physical channel.

Optionally, the processing module is configured to skip receiving the first feedback information, where an interval between the time domain position associated with the second PDSCH and a time domain position associated with the first physical channel is greater than or equal to a first threshold; or receive the first feedback information transmitted by using the first physical channel, where an interval between the time domain position associated with the second PDSCH and a time domain position associated with the first physical channel is less than or equal to a first threshold.

Optionally, the first threshold is determined based on a first time, and the first time includes one or more of the following times: a preparation time for a physical uplink control channel PUCCH; a preparation time for uplink control information UCI; and a preparation time for a physical uplink shared channel PUSCH.

Optionally, the first threshold is greater than or equal to the first time.

Optionally, the time domain position associated with the second PDSCH includes: a starting position or a starting symbol or the first symbol of the second PDSCH; or an ending position or an ending symbol or the last symbol of the second PDSCH.

Optionally, the time domain position associated with the first physical channel includes: a starting position or a starting symbol or the first symbol of the first physical channel, or an ending position or an ending symbol or the last symbol of the first physical channel.

Optionally, the second PDSCH is a semi-persistent scheduling SPS PDSCH or a PDSCH scheduled by DCI.

Optionally, the first PDSCH is a SPS PDSCH.

Optionally, the first physical channel is a PUSCH or a PUCCH.

Optionally, a resource, in the second time unit, used to transmit the first feedback information cannot be used for uplink transmission.

Optionally, the second time unit is a downlink symbol.

Optionally, the resource occupied by the first physical channel may be used for uplink transmission.

Optionally, the first time unit is an uplink symbol and/or a flexible symbol.

Optionally, the operation for the first feedback information includes receiving the first feedback information, or not receiving the first feedback information transmitted by using the first physical channel.

Figure 14:
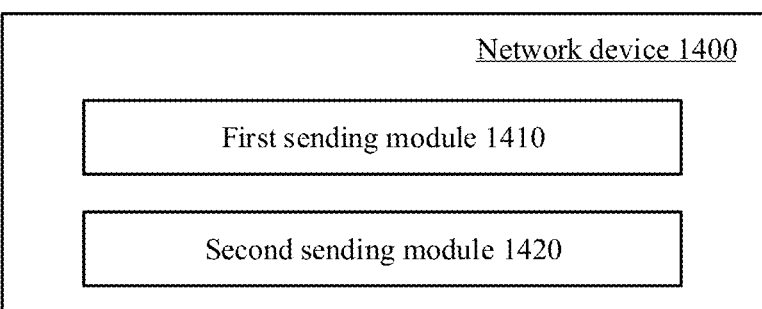
FIG. 14 is a schematic structural diagram of a network device according to another embodiment of this application.

FIG. 14 is a schematic structural diagram of a network device according to another embodiment of this application. The network device 1400 in FIG. 14 includes a first sending module 1410 and a second sending module 1420.

The first sending module 1410 may be configured to send a first physical downlink shared channel PDSCH. First feedback information corresponding to the first PDSCH is transmitted by using a first physical channel, a first time unit in which the first physical channel is located is later than a second time unit, and the second time unit is a time unit determined based on pre-configured information and used to transmit the first feedback information.

The second sending module 1420 may be configured to send a second PDSCH. A time domain position associated with the second PDSCH meets a first condition, and a hybrid automatic repeat request HARQ process number carried in the second PDSCH is different from HARQ process number carried in the first PDSCH.

Optionally, that the time domain position associated with the second PDSCH meets a first condition includes: the time domain position associated with the second PDSCH is later than or equal to a time domain position associated with a first PDCCH, where the first PDCCH is used to carry first DCI, and the first DCI is used to schedule or indicate the first physical channel.

Optionally, the time domain position associated with the first PDCCH includes: a starting position or a starting symbol or the first symbol of the first PDCCH, or an ending position or an ending symbol or the last symbol of the first PDCCH.

Optionally, that the time domain position associated with the second PDSCH meets a first condition includes: an interval between the time domain position associated with the second PDSCH and a time domain position associated with the first physical channel is less than or equal to a first threshold.

Optionally, the time domain position associated with the first physical channel includes: a starting position or a starting symbol or the first symbol of the first physical channel, or an ending position or an ending symbol or the last symbol of the first physical channel.

Optionally, the first threshold is determined based on a first time, and the first time includes one or more of the following times: a preparation time for a PUCCH; a preparation time for UCI; and a preparation time for a PUSCH.

Optionally, the first threshold is greater than or equal to the first time.

Optionally, the time domain position associated with the second PDSCH includes: a starting position or a starting symbol or the first symbol of the second PDSCH; or an ending position or an ending symbol or the last symbol of the second PDSCH; or a starting position or a starting symbol or the first symbol of a second PDCCH; or an ending position or an ending symbol or the last symbol of a second PDCCH, where the second PDCCH is used to carry second DCI, and the second DCI is used to schedule the second PDSCH.

Optionally, the first PDSCH is a SPS PDSCH.

Optionally, the second PDSCH is a SPS PDSCH or a PDSCH scheduled by DCI.

Optionally, the first physical channel is a PUSCH or a PUCCH.

Optionally, a resource, in the second time unit, used to transmit the first feedback information cannot be used for uplink transmission.

Optionally, the second time unit is a downlink symbol.

Optionally, the resource occupied by the first physical channel may be used for uplink transmission.

Optionally, the first time unit is an uplink symbol and/or a flexible symbol.

Figure 15:
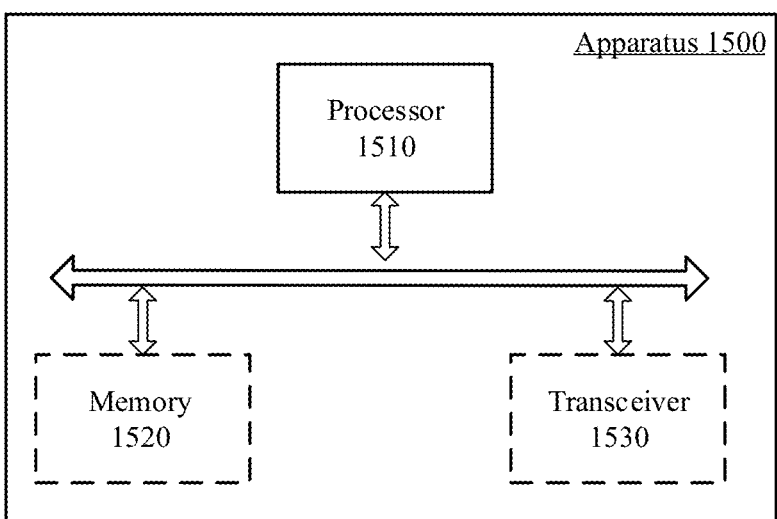
FIG. 15 is a schematic structural diagram of an apparatus according to an embodiment of this application.

FIG. 15 is a schematic structural diagram of an apparatus according to an embodiment of this application. The dashed lines in FIG. 15 indicate that the unit or module is optional. The apparatus 1500 may be configured to implement the methods described in the foregoing method embodiments. The apparatus 1500 may be a chip, a terminal device, or a network device.

The apparatus 1500 may include one or more processors 1510. The processor 1510 may allow the apparatus 1500 to implement the methods described in the foregoing method embodiments. The processor 1510 may be a general-purpose processor or a dedicated processor. For example, the processor may be a central processing unit (central processing unit, CPU). Alternatively, the processor may be another general-purpose processor, a digital signal processor (digital signal processor, DSP), an application-specific integrated circuit (application specific integrated circuit, ASIC), a field-programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 1500 may further include one or more memories 1520. The memory 1520 stores a program that may be executed by the processor 1510 to cause the processor 1510 to perform the methods described in the foregoing method embodiments. The memory 1520 may be independent of the processor 1510 or may be integrated into the processor 1510.

The apparatus 1500 may further include a transceiver 1530. The processor 1510 may communicate with another device or chip through the transceiver 1530. For example, the processor 1510 may send and receive data to and from another device or chip through the transceiver 1530.

An embodiment of this application further provides a computer-readable storage medium for storing a program. The computer-readable storage medium may be applied to the terminal device or the network device provided in the embodiments of this application, and the program causes a computer to execute the methods to be performed by the terminal device or the network device in various embodiments of this application.

An embodiment of this application further provides a computer program product. The computer program product includes a program. The computer program product may be applied to the terminal device or the network device provided in the embodiments of this application, and the program causes a computer to execute the methods to be performed by the terminal device or the network device in various embodiments of this application.

An embodiment of this application further provides a computer program. The computer program may be applied to the terminal device or the network device provided in the embodiments of this application, and the computer program causes a computer to execute the methods to be performed by the terminal device or the network device in various embodiments of this application.

It should be understood that, in the embodiments of this application, "B that is corresponding to A" means that B is associated with A, and B may be determined based on A. However, it should also be understood that, determining B based on A does not mean determining B based only on A, but instead B may be determined based on A and/or other information.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

It should be understood that, in the embodiments of this application, sequence numbers of the foregoing processes do not mean execution sequences. The execution sequences of the processes should be determined according to functions and internal logic of the processes, and should not be construed as any limitation on the implementation processes of the embodiments of this application.

In several embodiments provided in this application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (digital subscriber line, DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
determining, by a terminal device, a first physical channel or a first time unit in which a first physical channel is located, wherein the first physical channel is used to transmit first feedback information corresponding to a first physical downlink shared channel (PDSCH), the first time unit is later than a second time unit, and the second time unit is a time unit determined based on pre-configured information and used to transmit the first feedback information;

receiving, by the terminal device, a second PDSCH, wherein a hybrid automatic repeat request (HARQ) process number carried in the second PDSCH is the same as HARQ process number carried in the first PDSCH; and
determining, by the terminal device, an operation for the first feedback information based on a time domain position associated with the second PDSCH.

2. The method according to claim 1, wherein the time domain position associated with the second PDSCH comprises:
a starting position, a starting symbol, or the first symbol of the second PDSCH; or
an ending position, an ending symbol, or the last symbol of the second PDSCH; or
a starting position, a starting symbol, or the first symbol of a second physical downlink control channel (PDCCH); or
an ending position, an ending symbol, or the last symbol of a second PDCCH,
wherein the second PDCCH is used to carry second downlink control information (DCI), and the second DCI is used to schedule the second PDSCH.

3. The method according to claim 1, wherein the determining, by the terminal device, an operation for the first feedback information based on a time domain position associated with the second PDSCH comprises:
the terminal device determines that the first feedback information is to be discarded, wherein the second PDSCH is a semi-persistent scheduling (SPS) PDSCH, and the time domain position associated with the second PDSCH is earlier than or equal to a time domain position associated with the first physical channel.

4. The method according to claim 3, wherein the time domain position associated with the second PDSCH comprises:
a starting position, a starting symbol, or the first symbol of the second PDSCH; or
an ending position, an ending symbol, or the last symbol of the second PDSCH.

5. The method according to claim 3, wherein the time domain position associated with the first physical channel comprises:
a starting position, a starting symbol, or the first symbol of the first physical channel; or
an ending position, an ending symbol, or the last symbol of the first physical channel.

6. The method according to claim 1, wherein the first PDSCH is a SPS PDSCH.

7. The method according to claim 1, wherein the first physical channel is a physical uplink shared channel (PUSCH) or a physical uplink control channel (PUCCH).

8. The method according to claim 1, wherein a resource, in the second time unit, used to transmit the first feedback information is not capable of being used for uplink transmission.

9. The method according to claim 1, wherein the second time unit is a downlink symbol.

10. A network device, comprising at least one processor, and at least one memory including computer program, wherein the at least one memory and the at least one processor are configured with the computer program, to cause the network device at least to:
send a first physical downlink shared channel (PDSCH), wherein first feedback information corresponding to the first PDSCH is transmitted by using a first physical channel, a first time unit in which the first physical channel is located is later than a second time unit, and the second time unit is a time unit determined based on pre-configured information and used to transmit the first feedback information;

send a second PDSCH, wherein a hybrid automatic repeat request (HARQ) process number carried in the second PDSCH is the same as HARQ process number carried in the first PDSCH; and determine an operation for the first feedback information based on a time domain position associated with the second PDSCH.

11. The network device according to claim 10, wherein the time domain position associated with the second PDSCH comprises:

a starting position, a starting symbol, or the first symbol of the second PDSCH; or an ending position, an ending symbol, or the last symbol of the second PDSCH; or a starting position, a starting symbol, or the first symbol of a second PDCCH; or an ending position, an ending symbol, or the last symbol of a second PDCCH, wherein the second PDCCH is used to carry second downlink control information (DCI), and the second DCI is used to schedule the second PDSCH.

12. The network device according to claim 10, wherein the network device is configured to skip receiving the first feedback information, wherein the second PDSCH is a semi-persistent scheduling (SPS) PDSCH, and the time domain position associated with the second PDSCH is earlier than or equal to a time domain position associated with the first physical channel.

13. The network device according to claim 12, wherein the time domain position associated with the second PDSCH comprises:

a starting position, a starting symbol, or the first symbol of the second PDSCH; or an ending position, an ending symbol, or the last symbol of the second PDSCH.

14. The network device according to claim 12, wherein the time domain position associated with the first physical channel comprises:

a starting position, a starting symbol, or the first symbol of the first physical channel; or an ending position, an ending symbol, or the last symbol of the first physical channel.

15. The network device according to claim 10, wherein the first PDSCH is a SPS PDSCH.

16. The network device according to claim 10, wherein the first physical channel is a physical uplink shared channel (PUSCH) or a physical uplink control channel (PUCCH).

17. The network device according to claim 10, wherein a resource, in the second time unit, used to transmit the first feedback information is not capable of being used for uplink transmission.

18. The network device according to claim 10, wherein the second time unit is a downlink symbol.

19. A terminal device, comprising at least one processor, and at least one memory including computer program, wherein the at least one memory and the at least one processor are configured with the computer program, to cause the terminal device at least to:

determine a first physical channel or a first time unit in which a first physical channel is located, wherein the first physical channel is used to transmit first feedback information corresponding to a first physical downlink shared channel (PDSCH), the first time unit is later than a second time unit, and the second time unit is a time unit determined based on pre-configured information and used to transmit the first feedback information;

receive a second PDSCH, wherein a hybrid automatic repeat request (HARQ) process number carried in the second PDSCH is the same as HARQ process number carried in the first PDSCH; and determine an operation for the first feedback information based on a time domain position associated with the second PDSCH.

20. The terminal device according to claim 19, wherein the time domain position associated with the second PDSCH comprises:

a starting position, a starting symbol, or the first symbol of the second PDSCH; or an ending position, an ending symbol, or the last symbol of the second PDSCH; or a starting position, a starting symbol, or the first symbol of a second physical downlink control channel (PDCCH); or an ending position, an ending symbol, or the last symbol of a second PDCCH, wherein the second PDCCH is used to carry second downlink control information (DCI), and the second DCI is used to schedule the second PDSCH.

\* \* \* \* \*